United States Patent [19]
Palanca et al.

[11] Patent Number: 6,122,715
[45] Date of Patent: Sep. 19, 2000

[54] METHOD AND SYSTEM FOR OPTIMIZING WRITE COMBINING PERFORMANCE IN A SHARED BUFFER STRUCTURE

[75] Inventors: Salvador Palanca; Vladimir Pentkovski; Niranjan L. Cooray, all of Folsom; Subramaniam Maiyuran, Fair Oaks; Angad Narang, Rancho Cordova, all of Calif.

[73] Assignee: Intel Corporation, Santa Clara, Calif.

[21] Appl. No.: 09/053,384

[22] Filed: Mar. 31, 1998

[51] Int. Cl.[7] .................................................. G06F 5/06
[52] U.S. Cl. ............................. 711/154; 711/156
[58] Field of Search .................. 711/154, 155, 711/156

[56] References Cited

U.S. PATENT DOCUMENTS 5,526,510  6/1996  Akkary et al. .
5,630,075  5/1997  Joshi et al. .

OTHER PUBLICATIONS

The UltraSPARC Processor—Technology White Paper, The UltrSPARC Architecture, Sun Microsystems, Jul. 17, 1997, p. 1.10.
21164 Alpha Microprocessor Data Sheet, Samsung Electronics, 1997.
Visual Instruction Set (VIS™) User's Guide, Sun Microsystems, Version 1.1, Mar. 1997.
AMD–3D Technology Manual, AMD, Publication No. 21928, Issued Date: Feb. 1998.

*Primary Examiner*—Jack A. Lane
*Attorney, Agent, or Firm*—Blakely, Sokoloff, Taylor & Zafman LLP

[57] ABSTRACT

An apparatus and method of optimizing write combining operations using write combining buffers. A plurality of control fields are assigned to each of the write combining buffers. Each of the control fields has a value corresponding to one of a plurality of write combining states. A first of the plurality of write combining states transitions to a second of the plurality of write combining states in response to a write combining operation.

22 Claims, 9 Drawing Sheets

| STATE | Y | ADDRESS | DATA | BW CONTROL FIELD | WCM | WCB | WCE | |
|---|---|---|---|---|---|---|---|---|
| #Y | 0 | - | - - - - - - - - | - - - - - - - - | - | - | - | 710 |
| NWC | 1 | a | - - - - XXXX | 00001111 | 0 | 0 | 0 | 720 |
| P | 1 | b | - - - X - - X - | 00010010 | 1 | 1 | 0 | 730 |
| F | 1 | b | XXXXXXXX | 11111111 | 1 | 1 | 0 | 740 |
| E VIA T$_6$ | 1 | b | - - - X - - X - | 00010010 | 0 | 1 | 0 | 750 |
| E VIA T$_7$ | 1 | b | XXXXXXXX | 11111111 | 0 | 0 | 0 | 760 |
| Y VIA T$_8$ | 0 | b | - - - - - - - - | - - - - - - - - | 0 | 0 | 1 | 770 |

| CASE | OPERATION IN FILL BUFFER | WCM BIT | WCB BIT | FULLY/PARTIALLY WRITTEN LINE | NUMBER OF EXTERNAL BUS REQUESTS | FINAL DESTINATION OF DATA |
|---|---|---|---|---|---|---|
| 1 | WB FAST STRING WRITE | 1 → 0 | 1 → 0 | FULLY | 1 | DATA ENDS UP IN L1 CACHE. EXTERNAL BUS IS SNOOPED TO INVALIDATE THE LINE IN OTHER PROCESSORS. |
| 2 | OTHER WC | 1 → 0 | 1 → 0 | FULLY | 1 | DATA ENDS UP IN EXTERNAL MEMORY. FULL LINE WC EVICTION. |
| 3 | WB FAST STRING WRITE | 1 → 0 | 1 → 0 | PARTIALLY | 1 | ISSUE CACHEABLE REQUEST TO BUS CONTROLLER FOR THE REST OF THE LINE. LINE COMES FROM THE L2 CACHE OR EXTERNAL MEMORY. WHEN THE REST OF THE LINE IS PUT IN THE FILL BUFFER, BWCF IS NOT OVERWRITTEN. LINE IS THEN TRANSFERRED TO L1 CACHE |
| 4 | OTHER WC | 1 → 0 | 1 | PARTIALLY | UP TO 4 | DATA ENDS UP IN EXTERNAL MEMORY. PARTIAL WC EVICTION |

METHOD AND SYSTEM FOR OPTIMIZING WRITE COMBINING PERFORMANCE IN A SHARED BUFFER STRUCTURE

BACKGROUND OF THE INVENTION

1. Field of the Invention

The invention relates in general to microprocessor systems and more particularly, to a system and method of optimizing performance of writecombining buffers in a shared buffer array.

2. Description of Related Art

The use of a cache memory with a processor facilitates the reduction of memory access time. The fundamental idea of cache organization is that by keeping the most frequently accessed instructions and data in the fast cache memory, the average memory access time will approach the access time of the cache. To achieve the maximum possible speed of operation, typical processors implement a cache hierarchy, that is, different levels of cache memory. The different levels of cache correspond to different distances from the processor core. The closer the cache is to the processor, the faster the data access. However, the faster the data access, the more costly it is to store data. As a result, the closer the cache level, the faster and smaller the cache.

The performance of cache memory is frequently measured in terms of its hit ratio. When the processor refers to memory and finds the word in cache, it is said to produce a hit. If the word is not found in cache, then it is in main memory and it counts as a miss. If a miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

The processor allows certain areas of system memory to be cached in the L1 and L2 caches. Other areas, such as memory mapped I/O, are uncacheable. Within individual regions of system memory, it also allows the memory type to be specified using a variety of system flags and registers. Write combining is an architectural extension to the cache protocol that can be used with writes of any memory type except strongly ordered uncacheable writes. The write combining technique combines several writes to the same cache line. Write combining requests to the bus controller are delayed until the line is fully written or an eviction condition occurs; therefore, reducing memory accesses and improving bus bandwidth.

However, the use of current write combining techniques suffer from a number of drawbacks. When there are a number of concurrent operations, it is difficult to manage the use of the write combining buffers. Each operation may have a different effect on the use of the write combining buffers, which might result in a degradation of the overall system performance. Also, using a shared buffer structure to support both write combining and non-write combining operations requires an algorithm to maximize performance out of a limited number of buffers.

SUMMARY OF THE INVENTION

An apparatus and method of optimizing write combining operations using write combining buffers. A plurality of control fields are assigned to each of the write combining buffers. Each of the control fields has a value corresponding to one of a plurality of write combining states. A first of the plurality of write combining states transitions to a second of the plurality of write combining states in response to a write combining operation.

DESCRIPTION OF THE INVENTION

Write combine is an architectural extension of the cache protocol that can be used with writes of any memory type except strongly ordered uncacheable writes (e.g., it is used for fast string moves of writeback memory type, with non-temporal stores and masked writes in writeback or writethrough memory types upon L1 cache misses, or on all stores of uncacheable speculative write combining memory type, etc.).

A method and apparatus for maximizing performance out of write combining operations using a shared buffer structure is disclosed. The method utilizes memory ordering constraints to ensure smooth eviction process.

In the following description, for purposes of explanation, numerous details are set forth in order to provide a thorough understanding of the invention. However, it will be apparent to one skilled in the art that these specific details are not required in order to practice the invention. In other instances, well known electrical structures and circuits are shown in block diagram form in order not to obscure the invention.

I. Principles of Operation

A. Write Combining Operations using Shared Fill Buffers

The write combining technique of the invention is an architectural extension to the cache protocol. The invention provides a solution for improving performance on certain operations, such as string moves or certain graphic applications, where cached memory accesses waste external bus bandwidth on cache line fills, when most accesses are writes. The write combining technique involves the use of a write combining protocol which maintains coherency with external writes, but avoids the penalty of coherence by deferring the coherence actions until eviction.

The write combining (WC) protocol involves the use of an array of buffers in the L1 cache controller, referred to as fill buffers. These buffers are shared with other requests. They not only service WC operations; they also service L1 cache miss requests, uncacheable requests and certain special cycles. When in WC mode, they act as temporary storage for data written by WC store instructions. The WC protocol waits until sufficient writes from the core have been combined in the WC buffer so that it is fully written, or until the occurrence of an eviction condition. By combining these writes, the WC protocol reduces the number of memory accesses and improves bus bandwidth.

B. Operations Supported by the WC Protocol

Operations that will use a fill buffer in the WC (i.e., write combining) mode include: (1) fast string writes of write back memory type, i.e., REP MOV; (2) USWC (i.e., uncacheable speculative write combining) memory type stores; and (3) write back (WB) and write through (WT) masked writes and non-temporal stores that miss the L1 cache. Stores of USWC memory types are uncacheable, weakly ordered and write combining. By weakly ordered, it is meant that it can be executed out of order with respect to previous or subsequent instructions. Non-temporal stores minimize or eliminate cache pollution.

C. Memory Ordering Constraints Specific

Various memory ordering constraints specific to WC operations (which are implemented in the WC technique of the invention, in optimizing system performance) include:

(1) The WC operations are weakly ordered; therefore, WC fill buffers are considered to be non-pending (i.e., subsequent loads and stores in program order can be executed out of order respect to previous write combining operations). An exception is WB fast string writes that are neither masked writes nor non-temporal stores, which instead follow the memory ordering constraints associated with WB memory type, but are mergeable with other WB fast string writes hitting the same cache line.

(2) WC operations are mergeable. They combine with other writes to the same cache line and do not serialize the writes. This behavior diminishes the number of external bus requests.

(3) WC fill buffers do not respond to external snoops, unless they have already started an eviction to external memory and are globally observed.

(4) WC fill buffers respond to self-modifying code (SMC) snoops, and need to be evicted in this case.

D. Fill Buffer Control Fields

Several control fields in the fill buffers are used to control the WC operations:

(1) The "WC Mode" control bit: indicates that the fill buffer entry is in write combining mode. It is set upon allocation of a WC fill buffer, and it is cleared upon the occurrence of a eviction condition. This will cause the eviction process to start.

(2) The "WC Buf" control bit is used to indicate that the fill buffer is a WC buffer. It is set when a fill buffer is allocated in WC mode. It is cleared when the WC buffer is fully written (i.e., equivalent to writing the whole cache line), or if evicting a WB fast string write, which is neither a masked write nor a non-temporal store. It is used to determine the request type that needs to be issued to the bus controller upon eviction. It is cleared for fill buffers not allocated in WC mode.

(3) The "WC Evicted" control bit: it indicates that the fill buffer has completed eviction of the WC fill buffer, and it is ready for deallocation.

E. Eviction Process for a WC Fill Buffer Servicing a USWC Write, or a WB or WT Masked Write or Non-temporal Store That Missed the L1 Cache The eviction process for a WC fill buffer occurs as follows:

Upon occurrence of the eviction condition, the "WC Mode" control bit for the corresponding WC fill buffer entry(ies) is/are cleared. The "WC Buf" control bit might be cleared as well, depending on the contents of the WC fill buffer (refer to paragraph above for setting and clearing of "WC Buf" control bit).

Next, the eviction request is issued to the bus controller. In response, the Bus controller sends global observation and picks up the data. The data is then written to external memory. Bus controller indicates to the L1 cache controller the transaction is complete, and the "WC Evicted" control bit for the corresponding fill buffer entry is set. The corresponding WC fill buffer is then deallocated.

F. Eviction Conditions

The following description relates to the eviction conditions and the number of WC fill buffers that will be evicted upon occurrence of the eviction conditions:

1) Memory ordering eviction conditions: These are eviction conditions that are necessary to ensure coherency and that the memory ordering rules associated with different memory types are followed.

(a) A load lock operation, an incoming UC (i.e., strongly ordered uncacheable) memory type instruction, a fencing instruction, an operation to PIC (i.e., programmable interrupt controller) memory range, and an incoming store miss which is aborted due to memory ordering constraints (for example, the incoming store misses all fill buffers and the L1 cache, but there is a pending store being serviced in the fill buffers which requires ordering). All these eviction conditions evict all outstanding WC fill buffers.

(b) A load hit to a WC buffer, a SMC hit to a WC buffer, or a non-combinable store hit to a WC buffer. These three eviction conditions only evict the WC buffer that was hit.

2) Deadlock avoidance eviction conditions: these conditions avoid possible deadlock situations when incoming instructions need a free fill buffer, but they are blocked by the L1 cache controller because all fill buffers are in use and the incoming instruction cannot be serviced. Obviously, if all fill buffers were in non-WC mode, none can be evicted.

G. WC Array Pointer

The WC technique of the invention utilizes a WC array pointer. In one embodiment, the WC array pointer is a circular pointer. Upon reset, it points to fill buffer entry 0. When a deadlock avoidance eviction condition occurs, and there is not a WC eviction in progress, the pointer advances to the next fill buffer entry. If the pointer was not on a WC fill buffer entry, no WC eviction will take place, although the WC pointer still advances to the next fill buffer entry. Accordingly, the latest a WC fill buffer would be evicted is upon the fourth deadlock avoidance eviction condition assuming an embodiment with four fill buffers (For example, fill buffers entry 0, 1 and 2 are in a non-WC mode, and entry 3 is in WC mode, the WC pointer points to fill buffer entry 0, thus, it would take four deadlock avoidance eviction conditions to evict the WC fill buffer entry 3). The WC circular pointer only advances upon an occurrence of an deadlock avoidance eviction condition, not for any other eviction condition.

H. Additional Performance Improvements

Some other performance improvements provided by the technique of the invention are as follows:

1) WC fill buffers are evicted if they are fully written without waiting for the occurrence of an eviction condition.

2) If a WC fill buffer is being evicted (i.e. eviction process has started but not yet completed), subsequent "deadlock avoidance eviction conditions" will not mark for eviction any additional WC fill buffers (i.e., clear the "WC Mode" fill buffer control field). In this case, the WC array pointer does not advance.

3) A load of USWC memory type hitting a non-WC fill buffer will be blocked since it is uncacheable, but it will not cause a WC fill buffer eviction even if there are no fill buffers available, and there are some outstanding WC fill buffers. This is because no two fill buffers can be allocated to service a request to the same address at any given time (i.e., they either merge the requests, if they are cacheable; or the second request is blocked and serialized until the first one is done, if they are uncacheable). Since even if there were fill buffers available, the incoming USWC load would be blocked, it makes no sense to evict an outstanding WC fill buffer to a completely different address.

I. Additional Features Controlled Through Mode Bits in a Control Register in the L1 Cache Controller Include:

1) The WC fill buffers are not evicted and the WC circular pointer is not advanced if an "avoiding deadlock eviction condition" occurs and there are some non-WC fill buffers in use. In this case, the incoming instruction is blocked until the non-WC buffers are completed and deallocated. This is the non-default feature (provided by setting the mode bit named "non WC in use"=1), while the default feature involves advancing the WC circular pointer and evicting a WC fill buffer if marked by the WC circular pointer.

2) The WC fill buffer is evicted, if there is only one fill buffer available, and the rest are all in WC mode, and there is an incoming WC instruction that requires the last fill buffer to be available (e.g., an incoming WC instruction miss). The buffer to be evicted in this case is the one marked by the WC circular pointer. This is the non-default feature (i.e., mode bit named "all WC in use"=1). Note that in activating the non-default feature, all fill buffers can never be in the WC mode (i.e., simultaneously to the last fill buffer available being allocated in WC mode, the WC buffer pointed by the WC array pointer is evicted.) As a result, there is always a free fill buffer to service an incoming WC instruction; however, in utilizing this feature, it reduces by one fill buffer entry the number of fill buffers available at any given time in WC mode.

3) At most, only one fill buffer is a configured in WC mode at any given time. As a result, an incoming instruction to a second WC line allocates a second WC buffer, but evicts the first WC buffer. Again, this is the non-default feature (i.e., mode bit named "1 to 4 WC buffers"=1). This feature frees up all but one WC buffer to service non-WC cacheable misses, non-WC uncacheable requests and special cycles. However, it limits the performance of write combining operations. This feature is only desirable when the program rarely intends to use write combining.

As mentioned earlier, a load hit to a WC buffer will evict the WC buffer. If the load is cacheable and the WC buffer is servicing a writeback (WB) fast string write, data will be forwarded to the load; however, in any other case, the load will be blocked, and it will need to be reissued once the WC fill buffer that was hit has completed its eviction, and it is deallocated.

To minimize the number of external bus requests, it is preferred to complete line writes, rather than evicting partial writes.

II. Implementation

Figure 1:
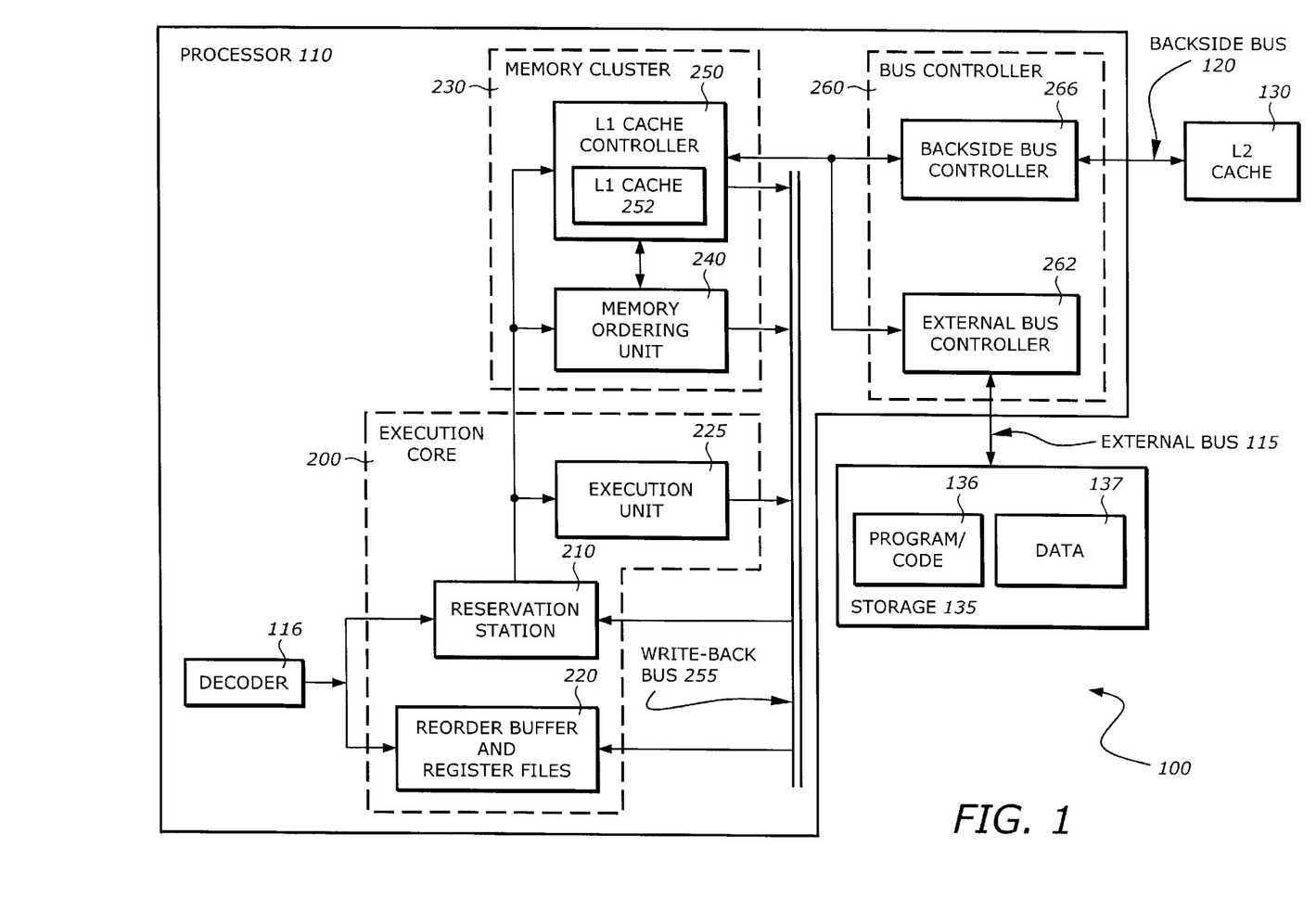
FIG. 1 is a detailed diagram illustrating one embodiment of the computer system 100 which utilize the invention.

FIG. 1 is a detailed diagram illustrating one embodiment of the computer system 100 which utilizes the teachings of the invention according to one embodiment of the invention. While one exemplary computer system is described, the invention can be implemented in any number of different computer systems (e.g., one that has more or less cache levels, one that uses a different register renaming and/or out of order execution architecture, etc. For simplicity, only relevant elements of the system 100 are shown. The computer system 100 includes the processor 110, a backside bus 120, a level 2 (L2) cache 130, a processor bus 115, and a storage device 135. For example, the storage device 135 may include read only memory (ROM), random access memory (RAM), magnetic disk storage mediums, optical storage mediums, flash memory devices, and/or other machine-readable mediums. The storage device has stored therein program code 136 and data 137. Data 137 represents data stored in one or more of the formats described herein. Program code 136 represents the necessary code for performing any and/or all of the techniques in the invention. Of course, the storage device 135 preferably contains additional software (not shown), which is not necessary to understanding the invention.

The processor 110 includes decoder 116, an execution core 200 (which includes, for example, a reservation station 210, a re-order buffer 220, an execution unit 225), a memory cluster 230, a write-back data bus 255, and a bus controller 260. The memory cluster 230 further includes a memory ordering unit 240 and a Level 1 (L1) cache controller 250 which has an L1 cache 252.

The decoder 116 issues instructions to the reservation station 210 and to the re-order buffer 220. The reservation station 210 dispatches the decoded instruction to the execution unit 225 and the memory cluster 230. If an arithmetic instruction is ready to be executed, the execution unit 225 will carry out the operation. If the instruction is a memory-referencing instruction, it will be dispatched to the memory ordering unit 240.

The write-back bus 255 provides the data path for the L1 cache controller 250 or the execution unit 225 to return the data back to the re-order buffer 220 and the reservation station 210.

The bus controller 260 provides an interface between the processor 110 and the L2 cache 130 or external storage 135. The bus controller 260 includes an external bus controller 262 and a backside bus controller 266. The external bus controller 262 provides the interface to the bus 115 to which the external storage 135 is connected. The backside bus controller 266 provides an interface to the L2 cache 130 via the backside bus 120.

Figure 2:
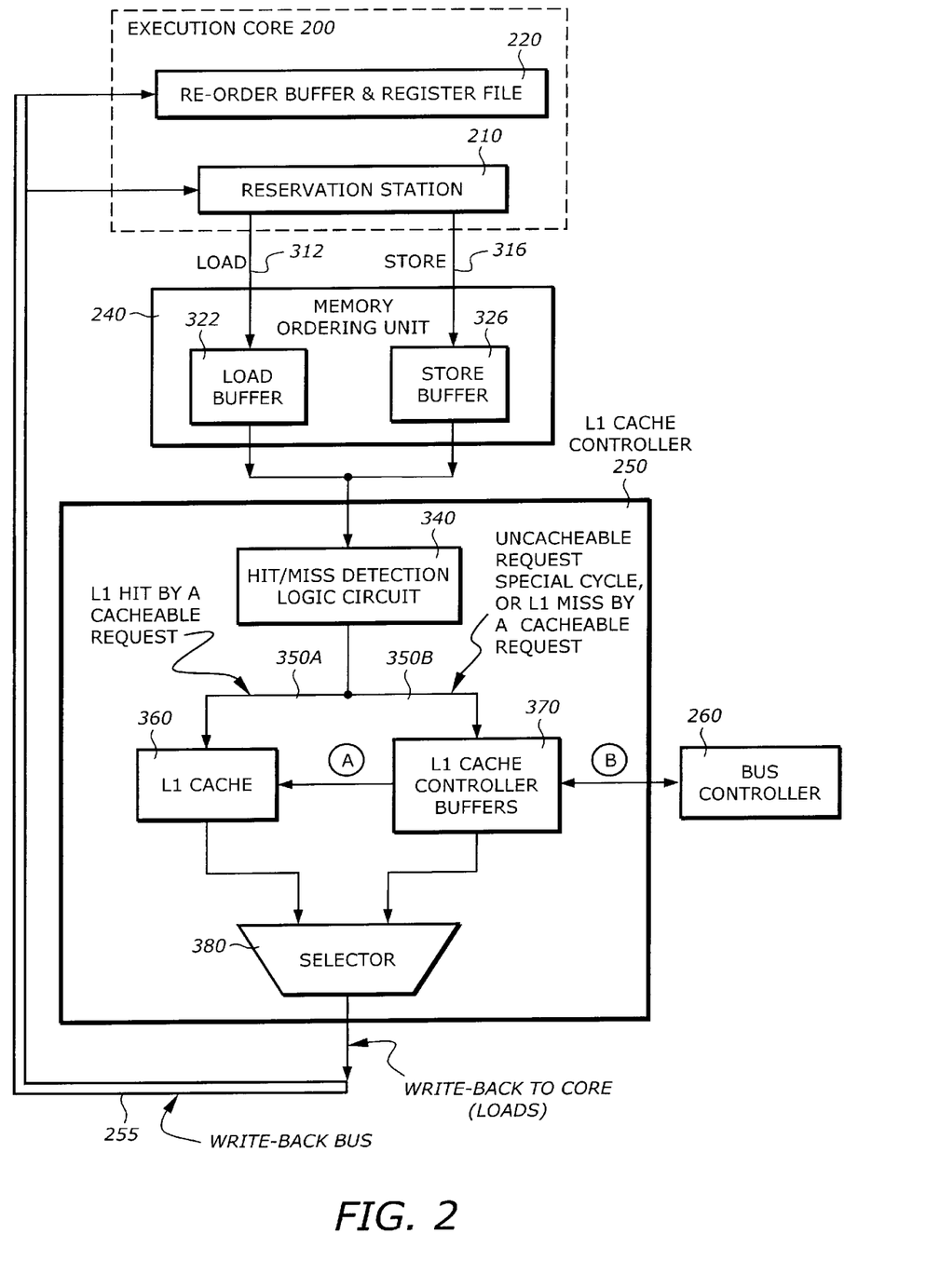
FIG. 2 is a diagram illustrating the relationship and data paths between the execution core 200 and various memory control elements.

FIG. 2 is a diagram illustrating the relationship and data paths between the execution core 200 and various memory control elements according to on e embodiment of the invention. It is assumed that the decoded instructions are memory-referencing instructions.

As shown in FIG. 2, the reservation station 210 dispatches the instruction to the memory ordering unit 240 via the Load bus 312 or the Store bus 316 if the instruction is a load or store instruction, respectively. The memory ordering unit 240 includes a load buffer unit 322 and a store buffer unit 326. The load buffer unit 322 receives the load instructions via the load bus 312. The store buffer unit 326 receives the store instructions via the store bus 316.

Instructions in the load buffer unit 322 and store buffer unit 326 are dispatched to the L1 cache controller 250. The L1 cache controller 250 includes, among other things, a hit/miss detection logic 340, a L1 cache 360, L1 cache controller fill buffers 370, and a write-back selector 380. The hit/miss detection logic 340 detects if the load or store instruction hits the L1 cache 360 or the fill buffers 370. If the instruction is a cacheable request and has a L1 hit, cache access is provided via a bus 350A to the L1 cache 360. If the instruction is an uncacheable request, a special cycle, or cacheable request with a L1 miss, the request is routed to the L1 cache controller fill buffer 370 via a bus 350B. For a cacheable request with a L1 miss, the missing data is transferred to the L1 cache 360 from the L1 cache controller buffer unit 370 via path A. This data typically comes from the L2 cache or the external memory.

The bus controller 260 services the requests from the L1 cache controller fill buffer 370 via path B. For cacheable request misses or uncacheable loads, the data flow is from the bus controller 260 to the L1 cache controller fill buffer 370. For uncacheable stores or writes, the data flow is from the L1 cache controller buffer 370 to the bus controller 260.

For loads, data are written back to the execution core 220, (in particular, to the re-order buffer and register file 220). The write-back data may come from the L1 cache 360 (for cache hits) or the L1 cache controller buffer 370 (for cacheable misses or uncacheable loads). The selector 380 switches between these two write-back sources to the write-back bus 255. The write-back data are then written to the re-order buffer and register file 220. The writeback data valid bit only goes to the reorder buffer. The writeback data also goes to the reservation station 210 in case bypassing to a subsequent load instruction is needed.

III. Write Combining Protocol

The following description includes various embodiments of the Write Combining Protocol of the invention.

Figure 3:
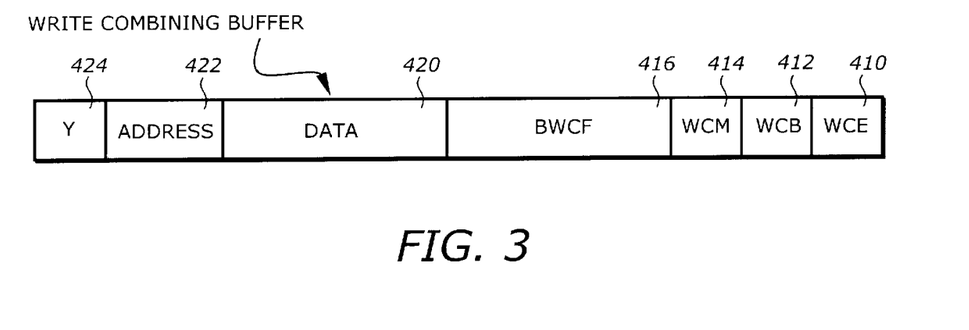
FIG. 3 is a diagram illustrating control fields in a write-combining buffer, according to one embodiment of the invention.

FIG. 3 is a diagram illustrating several control fields in a write-combining buffer according to one embodiment of the invention. The WC buffer 400 includes a write combining evicted (WCE) field 410, a write combining buffer (WCB) field 412, a write combining mode (WCM) field 414, a byte written control field (BWCF) 416, a DATA field 420, an ADDRESS field 422, and a Y field 424.

The WCE field 410 is a single bit indicating whether the WC buffer is evicted or not. The WCB field 412 is a single bit indicating that the buffer is a WC buffer. The WCM field 414 is a single bit indicating whether the buffer is in WC mode. While one embodiment is described in which single bits are use, alternate embodiments could use additional bits. These WC control fields are used to operate a fill buffer used as a WC buffer. Also, any fill buffer can be non-WC. The BWCF 416 indicates which byte(s) in the DATA field is (are) written by a store(s) from the core. A "0" indicates that the byte is not written, a "1" indicates that the corresponding byte is written.

The DATA field 420 stores the data in the buffer. In one embodiment, there are 32 bytes in the buffer. The DATA field is therefore 32 bytes. The ADDRESS field 422 stores the address of the data in the DATA field. In one embodiment, the ADDRESS field is 36 bytes. The Y field 424 is a single bit indicating if the buffer contains valid information or not. A "0" indicates invalid data, a '1' indicates valid data. The Y field has to be "1" for the fill buffer to be servicing an instruction; else, if Y='0', all other control fields in that fill buffer are meaningless (i.e., the fill buffer is not allocated).

Figure 4:
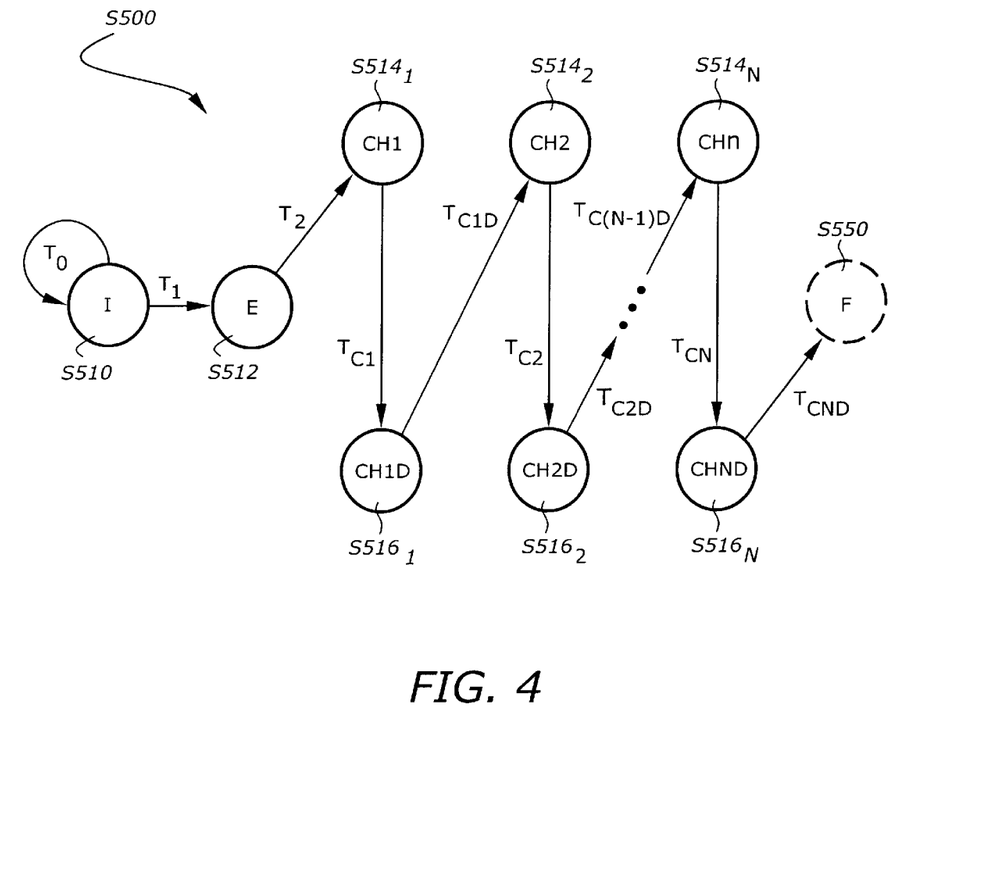
FIG. 4 is a state diagram S500 illustrating a partial write combining eviction process, according to one embodiment of the invention.

FIG. 4 is a state diagram S500 illustrating a USWC or non-temporal store partial WC eviction process. A partial write combining eviction takes place on a write combine buffer upon the occurrence of an eviction condition and all bytes in the buffer not written (i.e., BWCF not all 1's). Up to "n" requests to the bus controller will take place on a partial WC eviction, where "n"=number of chunks per line. In this embodiment, 1 line=4 chunks=32 bytes. Each chunk is therefore 8 bytes wide, which is equal to data size of internal bus. The state diagram S500 includes an idle (I) state S510, an "start eviction" (E) state S512, n chunk eviction (CHi) states S514$_i$(i=1, . . . , n,), n chunk eviction completion (CHiD) states S516i (i=1, . . . , n), and a transitional (F) state S550 that indicates the eviction is completed.

From the I state S510, if there is no WC eviction request (T0), the state remains in I state S510. If there is a uncacheable partial WC eviction request (i.e., upon occurrence of WC eviction condition)(T1), the state S500 transitions from the I state S510 to the E state S512.

State S512 indicates that the WC buffer eviction process has started. From state S512, the next step is CH1 state once the bus controller is ready to accept a request from the buffer. Here, in CH1 state, the L1 cache controller checks if there are any bytes written for chunk 0. If not, there is no need to evict chunk 0; therefore, the next step is state CH1D, which in this case, becomes a transitional state, and right away, move on to state CH2. If there was at least one byte written in chunk 0, while in state CH1, a bus request is issued to the bus controller to send the written data to external memory. The fill buffer control field BWCF becomes the byte enables for this request. Then, from state CH1 move on to state CH1D. In this case, the unit remains in CH1D until the bus controller acknowledges the request issued for chunk 0. Once acknowledged, the next step is CH2. This process, CHiD to CHi+1 to CHi+1D, is repeated until the L1 cache controller has gone through all chunks in the line in the buffer (i.e., in this embodiment, 4 chunks per line).

The state F S550 changes to the state I S510 automatically because the state F S550) is merely a transitional state, that indicates the eviction has completed and sets the "WC Evict" control field in the WC fill buffer. Once the bus controller has picked up all written data from the fill buffer, it sends a signal to the L1 cache controller to indicate that the fill buffer can be de-allocated.

Figure 5:
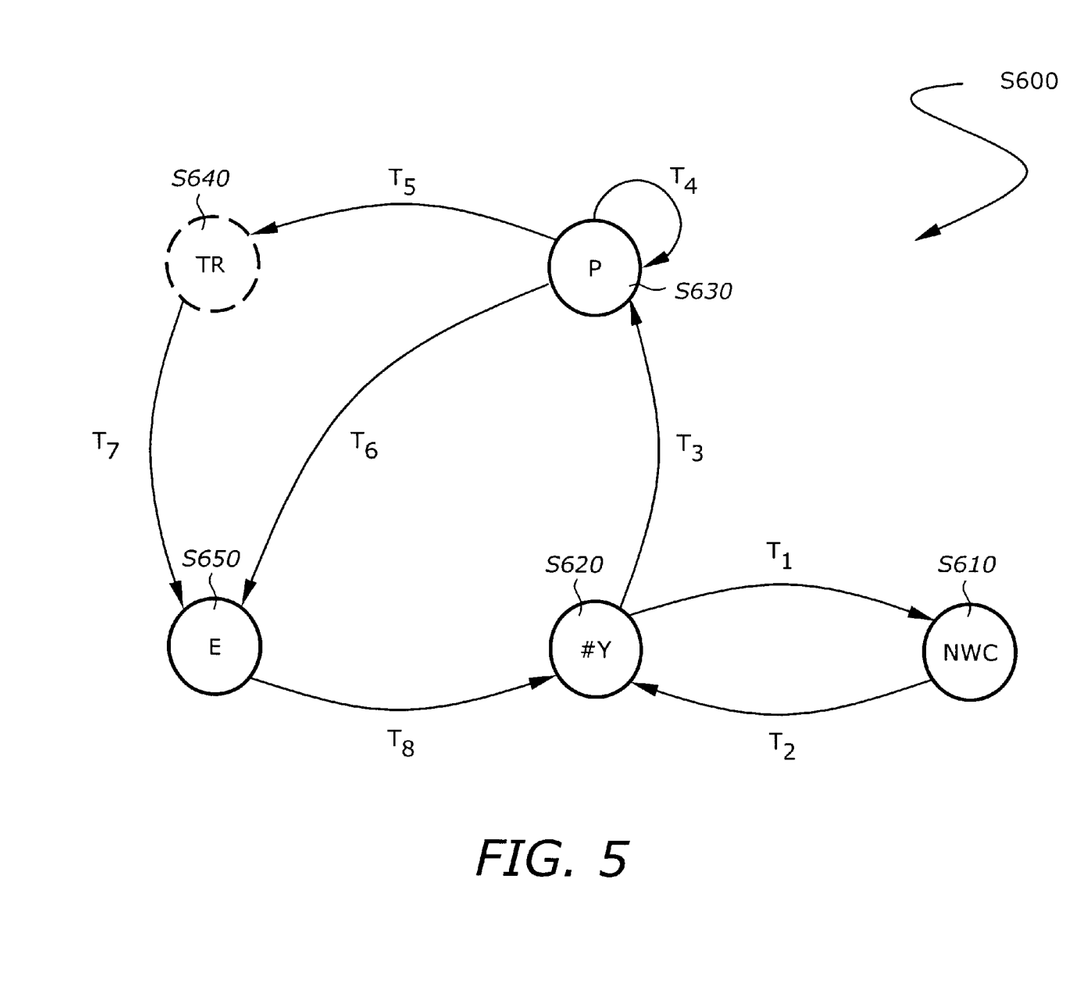
FIG. 5 is a state diagram S600 illustrating the operational states of the fill buffer, according to one embodiment of the invention.

FIG. 5 is a state diagram S600 illustrating the operational states of the fill buffer according to one embodiment of the invention. The state S600 includes a non-write-combining (NWC) state S610, an IDLE state S620, a WC mode (P) state S630, a transitional (TR) state S640, and an eviction (E) state S650.

The NWC state S610 is a state where the fill buffer is being used for a non-WC operation. The IDLE state S620 is the idle state where its contents are invalid (i.e., the fill buffer is not "in use," Y control field from FIG. 4 is cleared). The P state S630 is a state where the buffer is in WC mode. In the P state S630, some data has been written into the WC buffer but the data field is not fully written. The TR state S640 is not a stable state. It is an intermediate state between the P state S630 and the E state S650. It is reached if the line in the WC buffer is fully written (i.e., BWCF is all 1's).

The IDLE state S620 changes to the NWC state S610 when there is a non-WC operation that requests the use of the buffer (T1). From the NWC state S610, return back to the IDLE state S620 when the requested non-WC operation is completed (T2).

The IDLE state S620 changes to the P state S630 when there is a WC operation that requests the use of the buffer (T3).

The state machine remains in the P state S630, changes to the state F S640, or changes to the state S650 according to the transition conditions T4, T5, and T6, respectively. The state machine remains in the P state S630 as long as the WC buffer is not fully written and there is not an eviction condition. While in this state, WC stores from the core are combined in the WC buffer. The P state S630 changes to the TR state S640 when the WC buffer is fully written. The TR State S650 is a transitional state, and it changes to the E state right away, where the eviction process starts. Then, it will remain in the E state until the eviction is completed. The P state S630 changes to the E state S650 upon the occurrence of an eviction condition. Again, remain in the E state from the beginning to the completion of the eviction process.

The TR state S640 is a transition state, it changes to the E state S650 automatically (T7).

The E state S650 changes to the IDLE state S620 after the eviction has been completed.

Figure 6:
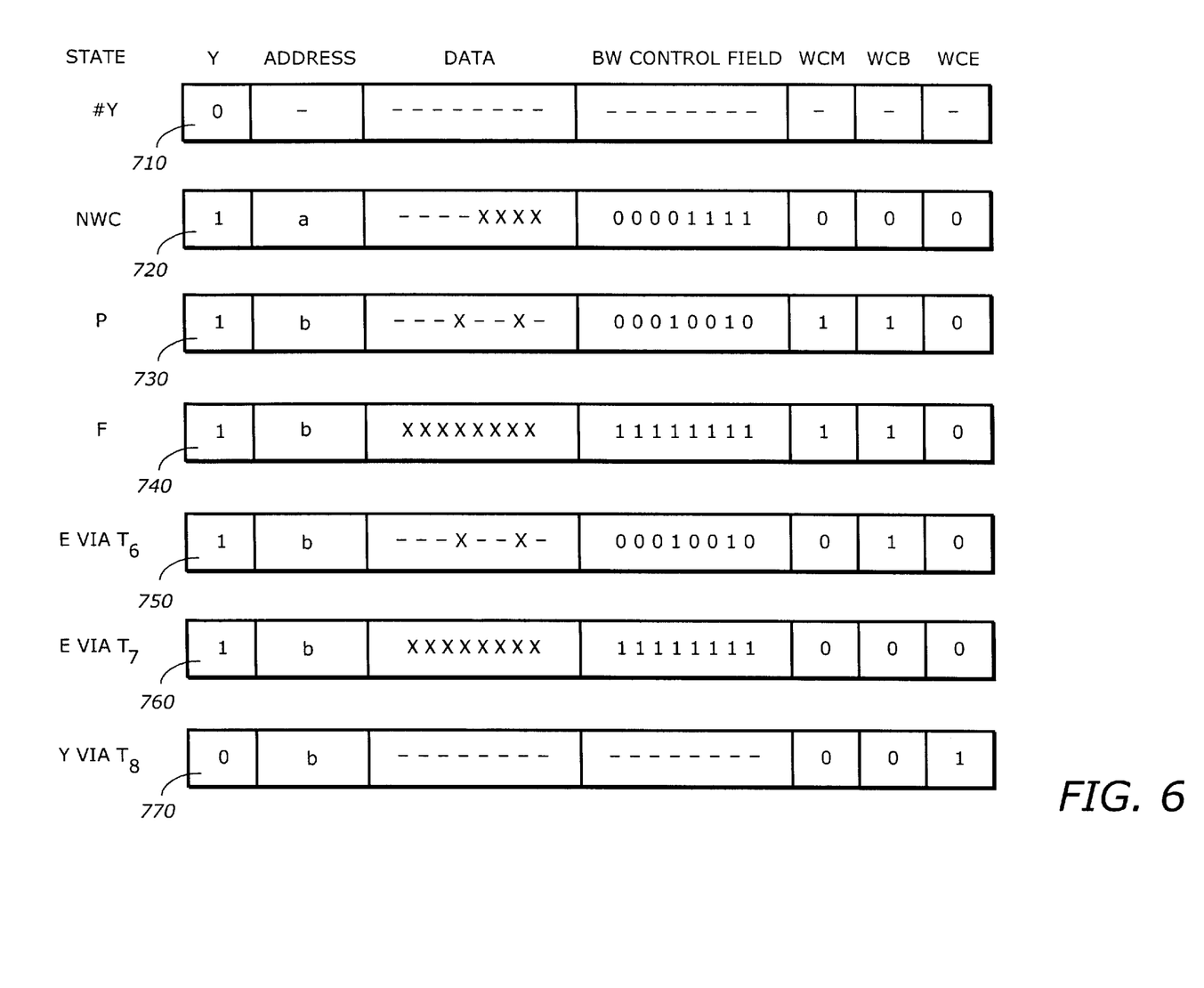
FIG. 6 is a diagram illustrating exemplary values of the fill buffer control fields, according to one embodiment of the invention.

FIG. 6 is a diagram illustrating values of the fill buffer control fields corresponding to the state diagram S600. The fill buffer control fields 710, 720, 730, 740, 750, 760, and 770 correspond to the IDLE state S620, the NWC state S610, the P state S630, the TR state S640, the E state S650 via T6, the E state S650 via T7, and the IDLE state via T8, respectively. Note that for simplicity, in FIGS. 7, 8, 9 and 10 the data field buffer is assumed to be 8 bytes, while in FIGS. 4, 5, 6 and 11, it has been assumed to be a more realistic 32 bytes.

As shown in the FBCF 710 corresponding to the IDLE state S610, the Y bit is zero because the fill buffer is not "in use" or allocated. The contents of all other control fields are don't cares.

As shown in the FBCF 720 corresponding to the NWC state, a non-WC operation writes 4 bytes to the buffer as shown in the DATA field (e.g., ———x x x x). The Y bit is set because the fill buffer is allocated to service an instruction. The BWCF is 00001111 indicating that the lower 4 bytes contain valid data written from the core. The ADDRESS field stores the corresponding address a. The WCM, WCB, and WCE remain zero because there is no WC operation. Note that there is a wide variety of non-WC operations requiring a fill buffer to be serviced. FBCF assumes a 4 byte store instruction.

As shown in the FBCF 730 corresponding to the P state S630, a WC operation writes two bytes to the buffer, byte 1 and byte 4. The Y bit is set because fill buffer is allocated to service an instruction. The DATA field is ———x———x— showing that bytes 1 and 4 are written from the core. The BWCF is 00010010. The ADDRESS field contains address b corresponding to the address of the data. The WCM is set indicating that the buffer is in the WC mode. The WCB is set indicating that the fill buffer is being used as a WC buffer. The WCE remains zero because there is no eviction.

As shown in the FBCF 740 corresponding to the F state, the buffer is fully written. The DATA field contains all valid data. The BWCF is 11111111 indicating that all bytes have been written from the core. The WCM, WCB, and WCE are 1, 1, and 0, respectively because the buffer is used in WC mode and there is no eviction.

As shown in the FBCF 750 corresponding to the E state S650 via T6, the buffer is not fully written but an external eviction condition occurs. The WCM is reset because the buffer is being evicted, and it will no longer write combine. The WCB is still set because the buffer has been written by WC operations, and it is a partial WC eviction to external memory following the process outlined in FIG. 4.

As shown in the FBCF 760 corresponding to the E state S650 via T7, the buffer is fully written due to WC operations and is ready for eviction. The WCM and WCB bits are reset because the buffer is fully written and no longer in the WC mode. The WCE bit remains zero because the eviction has started, but not yet completed.

As shown in the FBCF 770 corresponding to the IDLE state S620 via T8, the eviction has completed. The Y bit is zero to indicate that the buffer has been deallocated. The WCM and WCB are both zero because the buffer is no longer in WC mode. The WCE bit is set indicating that an eviction occurred on the previous transaction when the fill buffer was "in use." When WCE became 1, it indicated to move via T8 to IDLE state. Once it reaches IDLE state and Y bit is zero, all other control fields are don't care.

Figure 7:
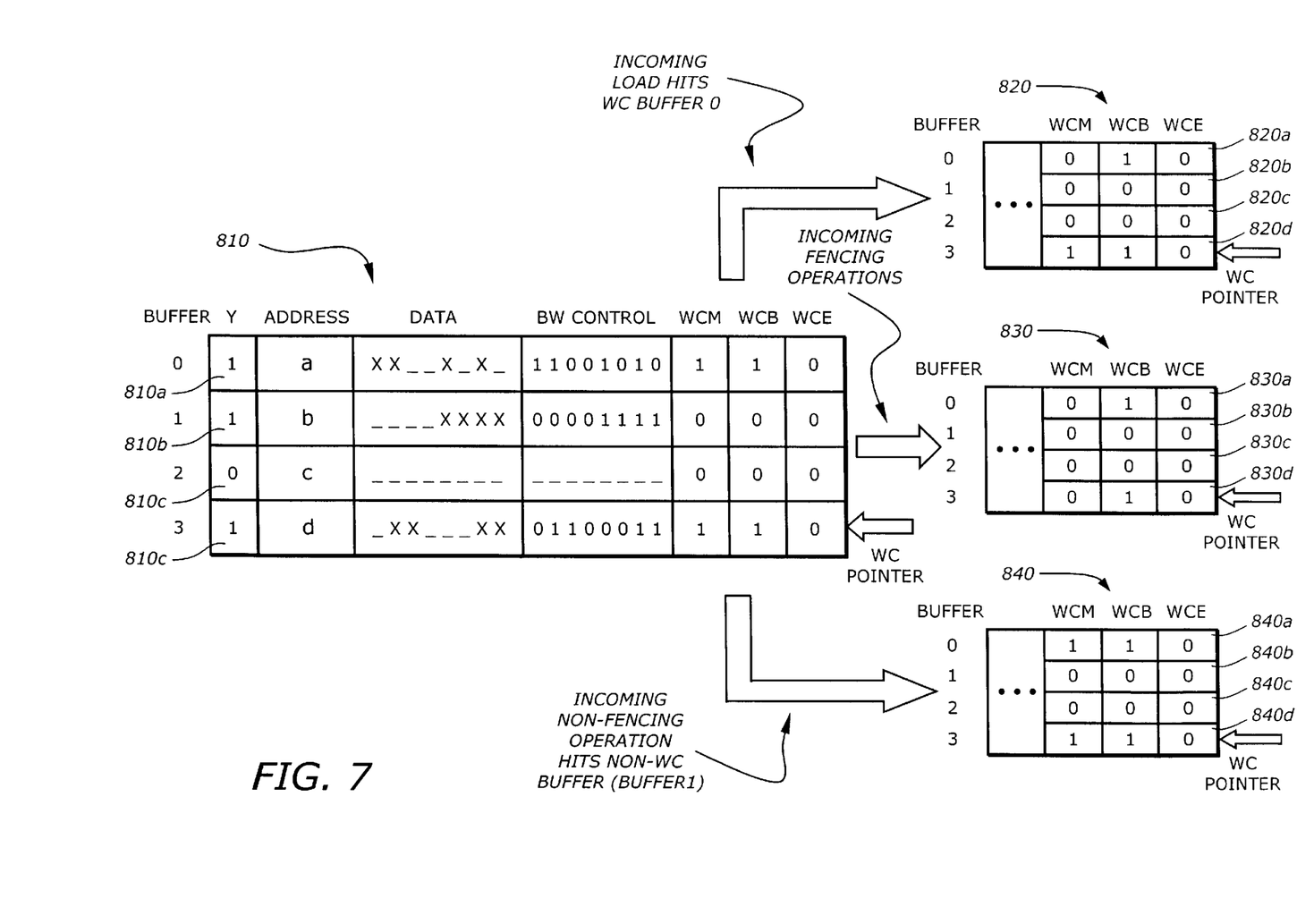
FIG. 7 is a diagram illustrating the contents of the fill buffer control fields before and after some exemplary incoming operations, according to one embodiment of the invention.

FIG. 7 is a diagram illustrating the contents of the fill buffer control fields before and after some exemplary incoming operations according to one embodiment of the invention. In one embodiment, there are 4 buffers in the L1 Cache Controller 250. A fill buffer control field (FBCF) 810 corresponds to the buffers before the operations. An FBCF 820 corresponds to the buffers after an incoming load hits to buffer 0. An FBCF 830 corresponds to the buffers after an incoming fencing operation. An FBCF 840 correspond to an incoming non-fencing operation which hits a non-WC buffer (buffer 1).

In the FBCF 810, the FBCF 810a, 810b, 810c, and 810d correspond to the buffers 0, 1, 2, and 3, respectively. The WC pointer is pointing to buffer 3. As shown in FBCF 810a, buffer 0 has valid data, bytes 1, 3, 6, and 7 are written, and it is used in WC mode. As shown in FBCF 810b, buffer 1 has valid data, bytes 0, 1, 2, and 3 are written, and it is not in WC mode. As shown in FBCF 810c, buffer 2 has no valid data (i.e., it is not "in use"). A shown in FBCF 810d, buffer 3 has valid data, bytes 0, 1, 5, and 6 are written, and it is used in WC mode.

The FBCF 820 shows the contents of the buffers when there is a load hit to the WC buffer 0. The WC pointer remains pointing to buffer 3. Since only buffer 0 is affected, the FBCFs of the other buffers remain unchanged. The FBCF 820b, 820c, and 820d are the same as the FBCFs 810b, 810c, and 810d, respectively. A load hit to buffer 0 causes the WCM of buffer 0 to reset to zero marking it for eviction. This is an example of "memory ordering eviction condition," where only the buffer that was hit is evicted.

The FBCF 830 shows the contents of the buffers when there is an incoming fencing operation. A fencing operation synchronizes all the WC operations before the fencing. All the WC fill buffers are marked for eviction by resetting the WCM bits. Therefore, the WCM bits in the FBCFs 830a, and 830d are reset. The WCM bit in FBCF 830b was already cleared before the incoming fencing operation, since it was not in WC mode.

The FBCF 840 shows the contents of the buffers when there is a non-fencing operation which hits buffer 1. Since the non fencing operation hits a non WC buffer and no two buffers can be allocated to service the same cache line, there is no point in evicting any WC buffer. This is not an eviction condition. Therefore, no eviction occurs and the incoming operation is blocked until buffer 1 is de-allocated. All FBCF's remain unchanged.

Figure 8:
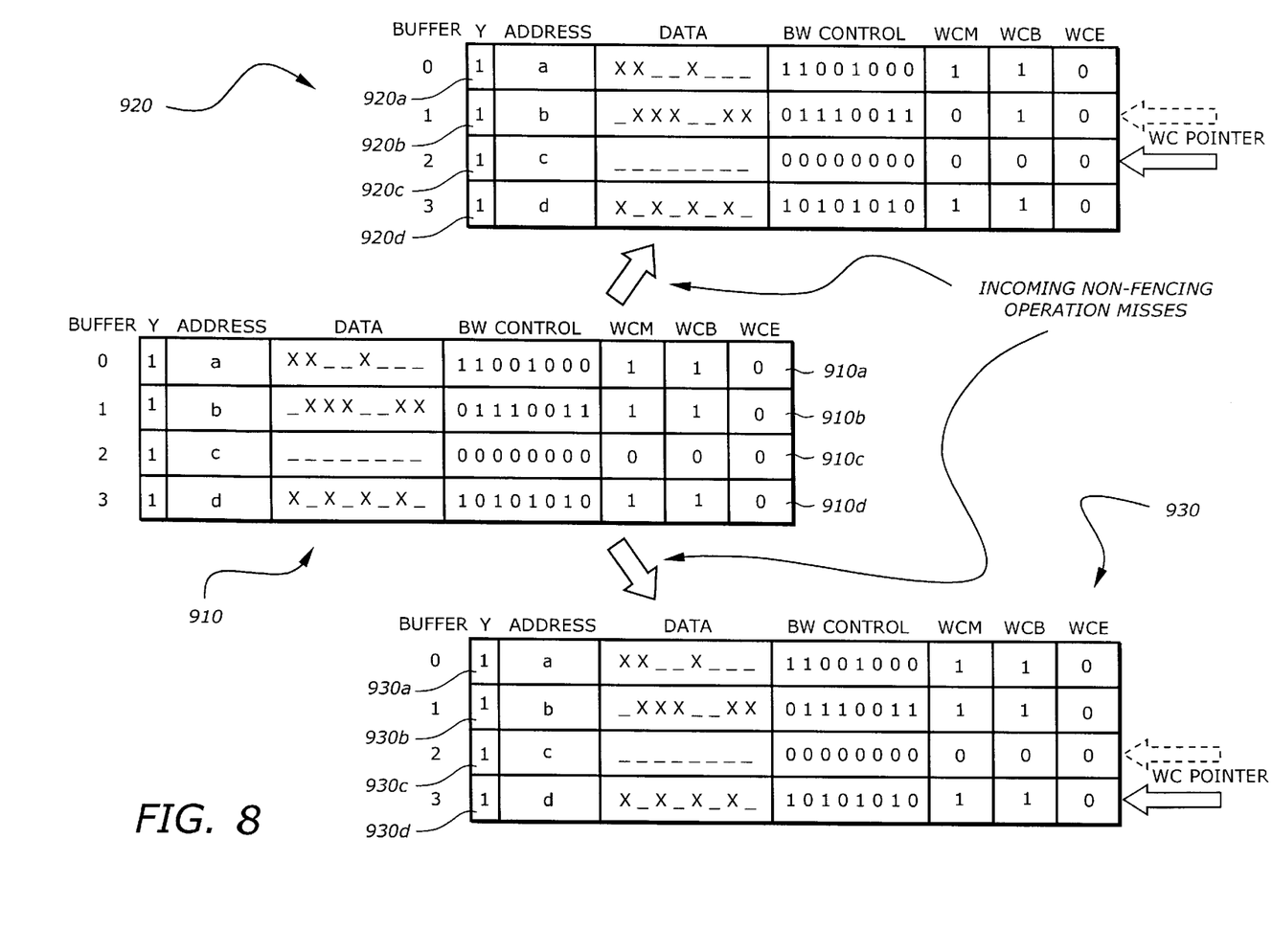
FIG. 8 is a diagram illustrating the contents of the fill buffer control fields before and after incoming non-fencing operation misses, according to one embodiment of the invention.

FIG. 8 is a diagram illustrating the contents of the fill buffer control fields before and after incoming non-fencing operation misses. A fill buffer control field (FBCF) 910 corresponds to the buffers before the operations. An FBCF 920 corresponds to the buffers after an incoming non-fencing operation miss and the WC pointer points to buffer 1. An FBCF 930 corresponds to the buffers after an incoming non-fencing operation miss and the WC pointer points to buffer 2.

The FBCF 910 shows the contents of the buffers before the operations. The FBCFs 910a, 910b, 910c, and 910d correspond to buffers 0, 1, 2, and 3, respectively. All buffers contain valid data as shown by the Y bits. Buffers 0, 1, and 3 are used in WC mode while buffer 2 is not, as shown by the WCM and WCB bits.

The FBCF 920 shows the contents of the buffers after an incoming non-fencing operation miss and the WC pointer points to buffer 1. Since buffer 1 is used in WC mode, it is marked for eviction by resetting bit WCM. The WC pointer advances to point to the next buffer, buffer 2. This is an example of a "deadlock avoidance condition."

The FBCF 930 shows the contents of the buffers after an incoming non-fencing operation miss and the WC pointer points to buffer 2. Since buffer 2 is not in WC mode, no eviction occurs. However, the WC pointer advances to point to the next buffer, buffer 3, because this is a deadlock avoidance eviction condition.

Figure 9:
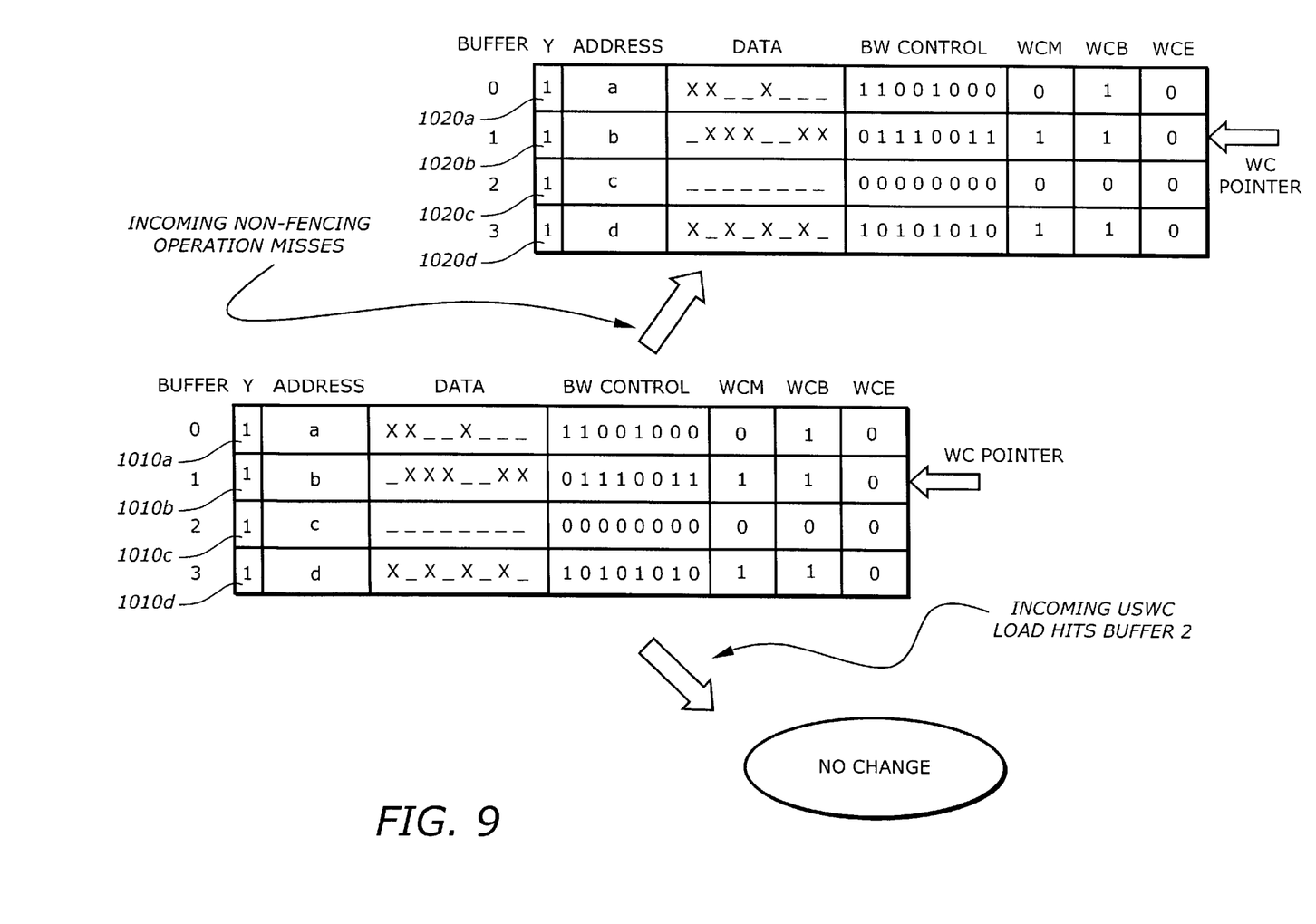
FIG. 9 is a diagram illustrating the contents of the fill buffer control fields before and after some exemplary incoming operations, according to one embodiment of the invention.

FIG. 9 is a diagram illustrating the contents of the fill buffer control fields before and after other incoming non-fencing operation misses. A fill buffer control field (FBCF) 1010 corresponds to the buffers before the operations. An FBCF 1020 corresponds to the buffers after an incoming non-fencing operation miss. The FBCF 1010 shows that buffer 0 is being evicted. The WC mode has been cleared due to an eviction condition, but the eviction has not completed yet, (i.e., WCE=0). The FBCF 1020 shows that the WC pointer remains pointing to buffer 1. A second WC fill buffer is not evicted because the new eviction condition is a deadlock avoidance eviction condition and one eviction is already in progress. When there is an incoming USWC load hits to buffer 2, there is no change in the buffers. No WC evictions occur because no two fill buffers can be allocated to the same address, and the USWC load hit a non-WC buffer. The incoming USWC load is blocked until buffer 2 is deallocated.

Figure 10:
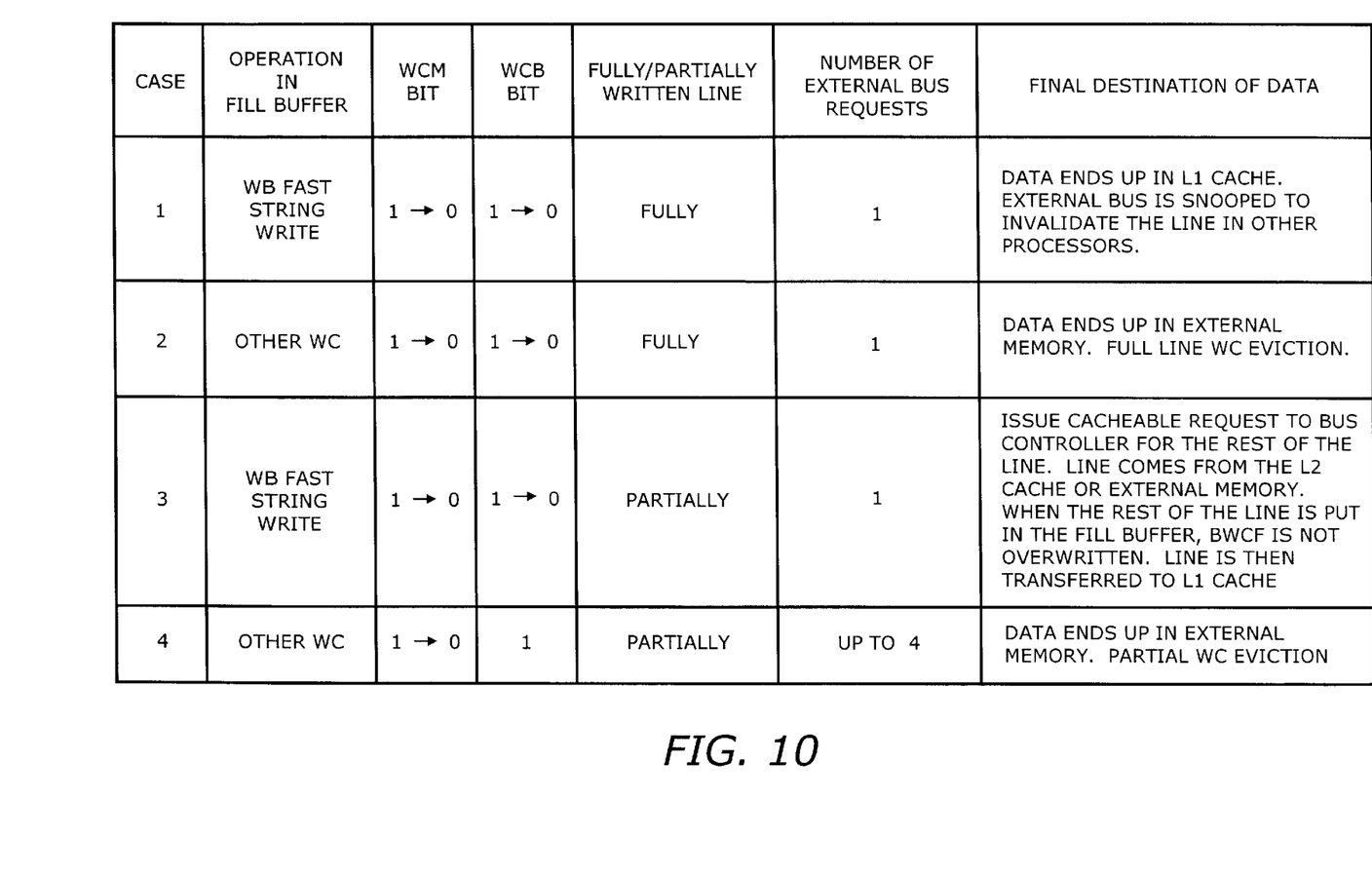
FIG. 10 is a table illustrating the transitions of the WC control bits and request type issued upon an eviction condition, according to one embodiment of the invention.

FIG. 10 is a table illustrating the request types and transitions of the WC control bits on a WC fill buffer upon an eviction condition. There are 4 cases that affect the WC control bits. In case 1, the operation in the fill buffer is a write-back (WB) fast string write. The WCM bit changes from 1 to 0. The WCB bit changes from 1 to 0. The line is fully written and the number of external bus requests is 1. The data ends up in the L1 cache. The external bus is snooped to invalidate the line in other processors.

In case 2, the operation in the fill buffer is other WC operations. Other WC operations are an USWC write, and a WB and WT masked write and non-temporal store that misses the L1 cache. (i.e., cases (2) and (3) in section B in page 7). The WCM bit changes from 1 to 0. The WCB bit changes from 1 to 0. The line is fully written and the number of external bus requests is 1. The data ends up in the external memory and a full line WC eviction occurs.

In case 3, the operation in the fill buffer is a write-back (WB) fast string write. The WCM bit changes from 1 to 0. The WCB bit changes from 1 to 0. The line is partially written and the number of external bus requests is 1. The L1 cache controller 250 issues a cacheable request to the bus controller for the rest of the line. The line comes from the L2 cache or external memory. When the rest of the line is put in the fill buffer, the BWCF is not overwritten (i.e., data previously written from the core is not overwritten). When line is in the fill buffer, it is transferred to the L1 cache.

In case 4, the operation in the fill buffer is other WC operations. Other WC operations are an USWC write, and a WB and WT masked write and non-temporal store that misses the L1 cache. (i.e., cases (2) and (3) in section B in page 7). The WCM bit changes from 1 to 0. The WCB bit remains 1. The line is partially written and based on a 32-byte cache line with four 8-byte chunks, the number of external bus requests is up to 4. The number of requests is equal to the number of chunks with at least one byte written. For a 32-byte cache line and an 8-byte chunk, there are up to 4 chunks. The data ends up in the external memory and a partial WC eviction occurs, following the process outlined in FIG. 5.

Write combining provides a solution to improve performance on certain operations, such as string moves or certain graphic applications, where cached memory accesses waste external bus bandwidth on cache line fills, when most accesses are writes. The write combining protocol still maintains the coherency with external writes. It avoids the penalty of coherence by deferring the coherence actions until eviction.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of optimizing write combining operations using write combining buffers, the method comprising:

(a) assigning a plurality of control fields to each of the write combining buffers, each of the control fields having a value corresponding to one of a plurality of write combining states, the write combining buffers being shared by the write combining operations and other requests; and (b) transitioning from a first of said plurality of write combining states to a second of said plurality of write combining states in response to a write combining operation.

2. The method of claim 1 wherein the plurality of control fields comprises a valid field, a write combine mode field, an eviction field, and a buffer field.

3. The method of claim 1 wherein the plurality of write combining states comprises a non write combining state, an idle state, a write combining mode state, a transitional state and an eviction state.

4. The method of claim 3, wherein the n on write combining state corresponds to a non write combining buffer.

5. The method of claim 3, wherein the idle state corresponds to a write combining buffer containing invalid data.

6. The method of claim 3, wherein the write combining mode state corresponds to a write combining buffer.

7. The method of claim 3, where in the eviction state corresponds to a write combining buffer that is subject to eviction.

8. The method of claim 3, wherein the transition state corresponds to an intermediate state between the write combining mode state and the eviction state.

9. The method of claim 4 wherein each of the plurality of write combining buffers is a circular buffer.

10. The method of claim 1 further comprising:

(c) maintaining a write combining pointer to point to a next available write combining buffer.

11. The method of claim 1, wherein the transitioning from a first of said plurality of write combining states to a second of said plurality of write combining states minimizes the occurrence of eviction of the corresponding write combining buffers.

12. An apparatus for optimizing write combining operations, comprising:

a plurality of write combining buffers, each having a plurality of control fields, each of the control fields having a value corresponding to one of a plurality of write combining states, the write combining buffers being shared by the write combining operations and other requests; and a control circuit that controls a transition from a first of said plurality of write combining states to a second of said plurality of write combining states in response to a write combining operation.

13. The apparatus of claim 12 wherein the plurality of control fields comprises a valid field, a write combine mode field, an eviction field, and a buffer field.

14. The apparatus of claim 12 wherein the plurality of write combining states comprises a non write combining state, an idle state, a write combining mode state, a transitional state and an eviction state.

15. The apparatus of claim 14, wherein the non write combining state corresponds to a non write combining buffer.

16. The apparatus of claim 14, wherein the idle state corresponds to a write combining buffer containing invalid data.

17. The apparatus of claim 14, wherein the write combining mode state corresponds to a write combining buffer.

18. The apparatus of claim 14, wherein the eviction state corresponds to a write combining buffer that is subject to eviction.

19. The apparatus of claim 14, wherein the transition state corresponds to an intermediate state between the write combining mode state and the eviction state.

20. The apparatus of claim 12, wherein the control circuit comprises a write combining pointer that points to a next available write combining buffer.

21. The apparatus of claim 12 wherein each of the plurality of write combining buffers is a circular buffer.

22. The apparatus of claim 12, wherein the control circuit controls the transitioning from a first of said plurality of write combining states to a second of said plurality of write combining states to minimize the occurrence of eviction of the corresponding write combining buffers.

* * * * *